(12) United States Patent
Le Roux et al.

(10) Patent No.: US 11,627,089 B2
(45) Date of Patent: Apr. 11, 2023

(54) METHOD AND DEVICE FOR DETERMINING A TOPOLOGY OF A NETWORK OF WIRELESS ACCESS POINTS

(71) Applicant: SAGEMCOM BROADBAND SAS, Rueil Malmaison (FR)

(72) Inventors: Sylvain Le Roux, Rueil Malmaison (FR); Anthony Reuche, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 175 days.

(21) Appl. No.: 17/112,471

(22) Filed: Dec. 4, 2020

(65) Prior Publication Data
US 2021/0194814 A1 Jun. 24, 2021

(30) Foreign Application Priority Data
Dec. 20, 2019 (FR) ...................................... 1915181

(51) Int. Cl.
*H04L 47/2425* (2022.01)
*H04L 43/0852* (2022.01)
(Continued)

(52) U.S. Cl.
CPC ...... *H04L 47/2425* (2013.01); *H04L 43/0852* (2013.01); *H04L 45/02* (2013.01);
(Continued)

(58) Field of Classification Search
CPC . H04L 47/2425; H04L 43/0852; H04L 45/00; H04L 45/02; H04L 45/24;
(Continued)

(56) References Cited

U.S. PATENT DOCUMENTS

2007/0286097 A1  12/2007  Davies
2010/0061272 A1*  3/2010  Veillette .............. H04W 40/005
370/254

(Continued)

FOREIGN PATENT DOCUMENTS

EP       2899931 A1    7/2015

OTHER PUBLICATIONS

Aug. 31, 2020 Search Report issued in French Patent Application No. 1915181.

*Primary Examiner* — Mohamed A Kamara
(74) *Attorney, Agent, or Firm* — Oliff PLC

(57) ABSTRACT

Determined is a topology of a communication network composed of a plurality of nodes connected or not respectively to at least one item of equipment, one of the nodes, referred to as the root node, being connected to an external network. A service class is determined for each node, from each node, information is obtained representing the quality of the link between the node and other nodes, for each link, parameters representing the quality of the link are calculated, the nodes are classified according to the service class thereof and according to the number of links making up the path that separates them from the root node, for each node and according to the classification, the possible paths connecting the node to the root node are determined, a score is calculated for each path determined, the path is selected for the node having the best score.

8 Claims, 3 Drawing Sheets

(51) Int. Cl.
  *H04L 45/02*      (2022.01)
  *H04L 45/24*      (2022.01)
  *H04W 28/02*      (2009.01)
  *H04W 40/24*      (2009.01)
  *H04L 47/2441*    (2022.01)

(52) U.S. Cl.
  CPC .......... *H04L 45/24* (2013.01); *H04L 47/2441* (2013.01); *H04W 28/0268* (2013.01); *H04W 40/246* (2013.01)

(58) Field of Classification Search
  CPC ... H04L 47/2441; H04L 45/124; H04L 41/12; H04W 28/0268; H04W 88/08; H04W 40/12; H04W 40/24; H04W 40/2406; H04W 24/02; H04W 76/22; H04W 84/18
  See application file for complete search history.

(56) References Cited

U.S. PATENT DOCUMENTS

2011/0231573 A1* 9/2011 Vasseur ................ H04L 45/124
                                                    709/238
2013/0094404 A1* 4/2013 Van Wyk ................ H04L 45/48
                                                    370/256

\* cited by examiner

METHOD AND DEVICE FOR DETERMINING A TOPOLOGY OF A NETWORK OF WIRELESS ACCESS POINTS

TECHNICAL FIELD

The invention relates to a method and a device for determining a topology of a network of wireless access points.

PRIOR ART

The determination of a topology in a network of wireless access points is often based on algorithms for searching for a path in a network chart. For example, the Dijkstra algorithm makes it possible to solve the problem of the shortest path from one point to another. More precisely, it calculates shortest paths from a source in an oriented network chart weighted by positive real numbers.

The use of such an algorithm in a domestic network comprising a plurality of wireless access points gives a result that is not adapted to the various items of equipment that are connected to the access points. This equipment is for example audio/video set-top boxes, television sets, telephones or equipment exchanging data.

It is then desirable to be able to determine a topology of such a network that is adapted to the various types of equipment that are connected to the access points.

DISCLOSURE OF THE INVENTION

The aim of the present invention is to solve the drawbacks of the prior art by proposing a device and a method for determining a topology of a network that takes into account the various types of equipment that are connected to the access points.

For this purpose, the invention relates to a method for determining a topology of a communication network composed of a plurality of nodes connected or not respectively to at least one item of equipment, one of the nodes, referred to as the root node, being connected to an external network, characterised in that the method comprises the steps of:
  determining a service class for each node, the service class being determined according to the equipment connected to the node,
  obtaining, from each node, information representing the quality of the link between the node and other nodes,
  calculating, for each link, parameters representing the quality of the link,
  classifying the nodes according to the service class thereof and, for the nodes having the same service class, according to the number of links making up the path that separates them from the root node,
  determining, for each node and according to the classification, possible paths connecting the node to the root node,
  calculating, for each path determined, a score from parameters representing the quality of the link and from values of coefficients dependent on the service class of the node,
  selecting the path for the node having the best score.

The invention also relates to a device for determining a topology of a communication network composed of a plurality of nodes connected or not respectively to at least one item of equipment, one of the nodes, referred to as the root node, being connected to an external network, characterised in that the determination device comprises:
  means for determining a service class for each node, the service class being determined according to the equipment connected to the node,
  means for obtaining, from each node, information representing the quality of the link between the node and other nodes,
  means for calculating, for each link, parameters representing the quality of the link,
  means for classifying the nodes according to the service class thereof and, for the nodes having the same service class, according to the number of links making up the path that separates them from the root node,
  means for determining, for each node and according to the classification, possible paths connecting the node to the root node,
  means for calculating, for each path determined, a score from parameters representing the quality of the link and from values of coefficients dependent on the service class of the node,
  means for selecting the path for the node having the best score.

Thus, by taking into account the type of equipment connected to each node and attributing to it a class according to the equipment connected to the node, by classifying the nodes according to the service class thereof and by determining a score that is a function of the values of coefficients dependent on the service class of the node, the present invention determines an optimum topology that takes into account the various types of equipment that are connected to the access point.

According to a particular embodiment, when a path is selected for a node, the method further comprises the steps of:
  associating, with each link in the selected path, a so-called fixed variable,
  associating, with each node of the path through which the path passes, a resolved variable, and determining, for each following node, possible paths connecting the following node to the root node, furthermore performed without using the links forming a loop with other links with which the fixed variable is associated.

According to a particular embodiment, the determination of possible paths connecting the following node to the root node is performed if the following node is not associated with the resolved variable.

According to a particular embodiment, the information representing the quality of the link between the node and other nodes is the physical bit rate of the link and the latency.

According to a particular embodiment, the communication network is a domestic network.

According to a particular embodiment, the device for determining the topology is included in a node.

The invention also relates to a computer program, characterised in that it comprises instructions for implementing, by a device, the method according to the first aspect, when said program is executed by a processor of said device.

The invention also relates to storage means, characterised in that they store a computer program comprising instructions for implementing, by a device, the method according to the first aspect when said program is executed by a processor of said device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DISCLOSURE OF EMBODIMENTS

Figure 1:
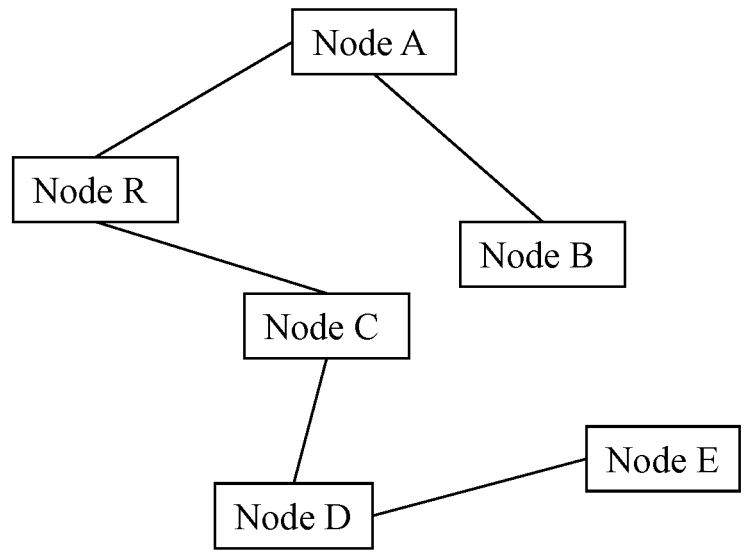
FIG. 1 shows schematically a wireless communication network consisting of a plurality of nodes wherein the present invention is implemented.

FIG. 1 depicts schematically a wireless communication network consisting of a plurality of nodes wherein the present invention is implemented.

The wireless communication network as shown in FIG. 1 is composed of six nodes.

The wireless communication network is for example a wireless communication network of the Wi-Fi type.

The node R is a so-called root node. The node is for example a residential gateway that connects the wireless communication network to an external network, such as the internet, which sends and receives data. The node R is according to the invention the starting point of the tree covering the network topology determined by the present invention.

The nodes A, B, C, D and E are connected or not respectively to at least one item of equipment.

For example, the node B is a node connected to a high-definition television set, the node C is for example connected to an audiovisual set-top box, the node D is for example connected to a telephone.

Each node is able to make qualitative measurements on each link connecting it to another node. For example, the present invention is described in an example that uses, as qualitative measurements, physical rate (PHY rate) measurements and latency measurements on each link connecting it to another node, but other types of measurement can be envisaged, such as for example packet-loss ratios.

Another node executes the algorithm according to the present invention. The present invention is described in an example wherein the node R determines the topology of the network. Naturally, the topology of the network may be determined by another node.

The node that determines the topology of the network is hereinafter referred to as the concentrator node. Naturally the present invention can be executed by a remote data-processing device, for example included in the external network.

In the example in FIG. 1, the node B is connected by a radio link to the node A, the node A is connected by a radio link to the node R, the node R is connected by a radio link to the node C, the node C is connected by a radio link to the node D and the node D is connected by a radio link to the node A.

Figure 2:
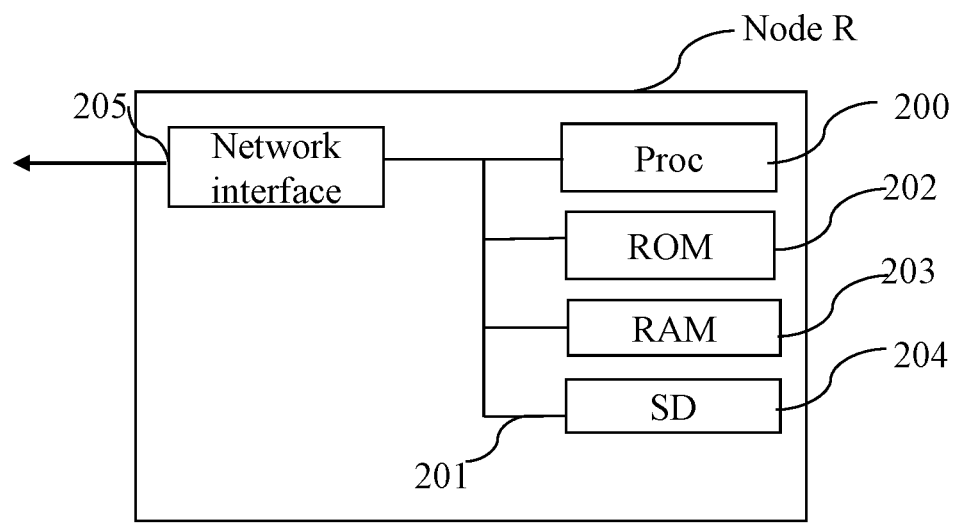
FIG. 2 illustrates schematically an example of hardware architecture of a node that determines the topology of the network according to the present invention.

It should be noted that the links connecting the nodes may in whole or in part be cabled links. FIG. 2 illustrates schematically an example of hardware architecture of the concentrator node that determines the topology of the network according to the present invention.

In the example in FIG. 2, the concentrator node is the node R.

The node R comprises:
a processor, microprocessor or microcontroller 200;
a volatile memory 203;
a non-volatile memory 202;
optionally, a storage-medium reader 204 such as an SD card (Secure Digital card) reader or a hard disk;
a network interface 205;
a communication bus 201 connecting the processor 200 to the ROM memory 202, to the RAM memory 203, to the storage medium reader 204 and to the interface 205.

The processor 200 is capable of executing instructions loaded in the volatile memory 203 from the non-volatile memory 202, from an external memory (not shown), from a storage medium, such as an SD card or the like, or from a communication network. When the concentrator 20 is powered up, the processor 200 is capable of reading instructions from the memory 203 and executing them. These instructions form a computer program that causes the implementation, by the processor 200, of all or part of the method described in relation to FIG. 3.

Figure 3:
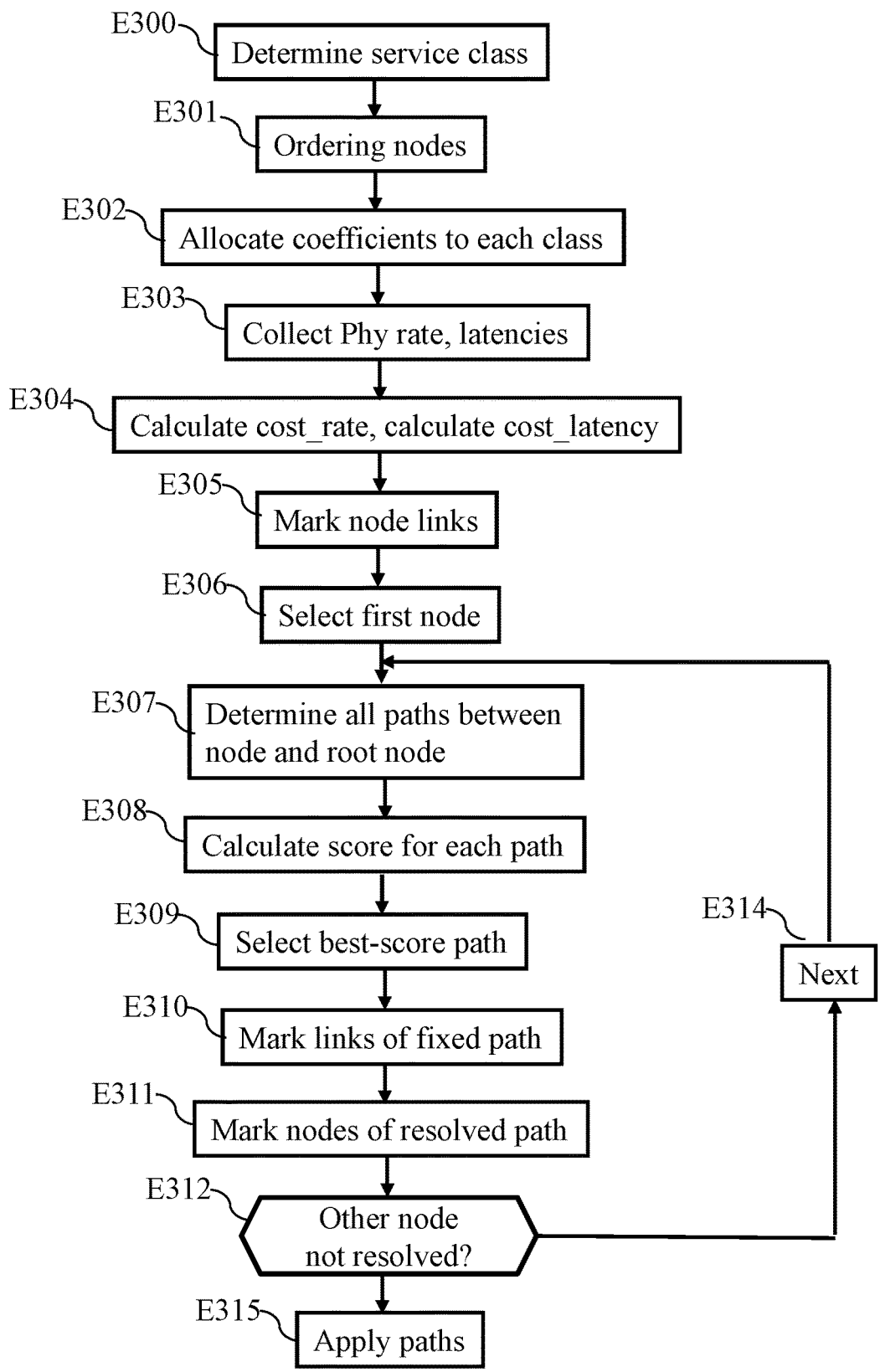
FIG. 3 illustrates an example of an algorithm executed by the node that determines the topology of the network according to the present invention.

All or part of the method described in relation to FIG. 3 may be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 3 illustrates an example of an algorithm executed by the node that determines the topology of the network according to the present invention.

In the step E300, the concentrator node determines the service class of each node of the wireless communication network.

Each node informs the concentrator node of the service class that is associated therewith. If a node is connected to a telephone, the service class associated with the node is the voice over IP class VOIP; if the node is connected to an audiovisual set-top box the service class associated with the node is the television over IP TV ultra high definition class IPTV UHD; if the node is connected to a television set the service class associated with the node is IP TV high definition IPTV HD. For the other nodes, the associated service class is data.

In a variant, the user of the communication network or the operator of the communication network determines the service class of each node by means of a graphical interface representing the various nodes. The user or the operator attributes a service class to each node by means of the graphical interface.

Thus the service class attributed to the nodes A, E and R is data, the service class associated with the node B is IPTV UHD, the service class associated with the node C is IPTV HD and the service class associated with the node D is VOIP.

At step E301, the nodes are ordered according to the service class thereof. For example, the nodes the service class of which is IPTV UHD are classified first, the nodes the service class of which is IP TV HD are classified after the nodes the service class of which is IPTV UHD, the nodes the service class of which is VOIP are classified after the nodes the service class of which is IPTV HD and the nodes the service class of which is data are classified after the nodes the service class of which is VOIP.

Within the same service class, the nodes are classified according to the number of links making up the path that separates them from the root node in a topology before the method according to the present invention is implemented. The node having the shortest path is classified first. When two nodes in the same service class have the same number of links making up the path that separates them from the root node, an arbitrary choice is for example made.

Thus the node C is classified first, the node B is classified second, the node D is classified third, the node R is classified fourth, the node A is classified fifth and the node E is classified sixth.

At the step E302, two values of coefficients $\alpha$ and $\beta$ are attributed for each service class. The values $\alpha=1$ and $\beta=0$ are attributed to the service class IPTV UHD; the values $\alpha=0.8$ and $\beta=0.2$ are attributed to the service class IPTV HD; the values $\alpha=0$ and $\beta=1$ are attributed to the service class VOIP and the values $\alpha=0.5$ and $\beta=0.5$ are attributed to the data class.

These coefficient values will hereinafter make it possible to determine an optimum topology that is adapted to each item of equipment connected to a node.

At the step E303, the concentrator collects, from each node, the physical rate (PHY rate) measurements and the latency measurements on each link connecting the node to another node.

At the step E304, the concentrator characterises each link for which it has obtained the physical rate (PHY rate) measurements and the latency measurements. The concentrator determines, for each link, the value of a variable denoted cost_rate and the value of a variable denoted cost_latency by means of the following formulae;

Cost_rate=5−(5*Phy rate/(Max(Phy rates))

Cost_latency=5*(latency−Min(latencies))/Max(latencies)

where Phy rate is the measurement of the physical rate for the link, latency is the measurement of latency for the link, Max(Phy rate) is the maximum physical rate value obtained from all the rate measurements obtained of the links, Max (latencies) is the maximum latency value obtained from all the latency measurements obtained of the links, and Min(latencies) is the minimum latency value obtained from all the latency measurements obtained of the links.

At the step E305, the concentrator associates the flexible variable with each link and the non-resolved variable with each node.

At the step E306, the concentrator selects the first node according to the order determined at the step E301.

Thus, according to the previous example, the node C is selected.

At the step E307, the concentrator determines all the possible paths between the node selected and the root node from the various links the measurements of which were obtained at the step E303 without using the links forming a loop with other links with which the fixed variable is associated.

For example, the concentrator determines the following paths between the selected node C and the root node R:

CR, CAR, CBR, CABR, CBAR, CDAR, CDBR, CDBAR, CEDBR and CEDBAR.

In this example, the successions of letters represent the various nodes through which the path passes.

Figure 4:
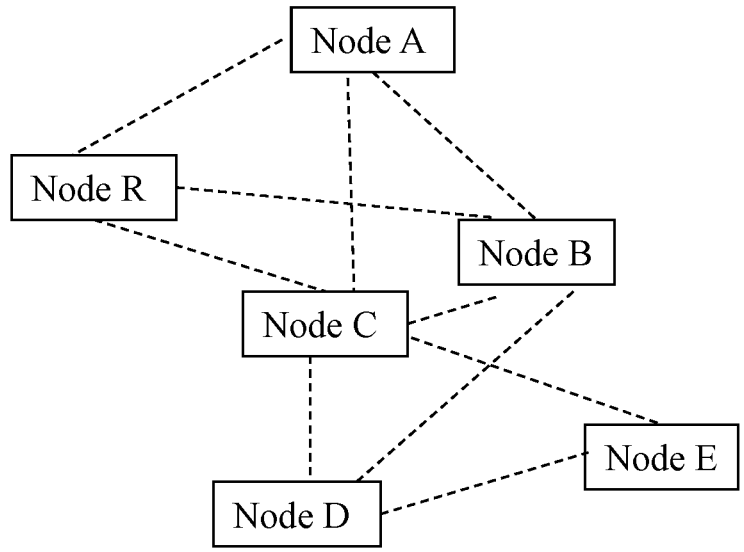
FIG. 4 illustrates an example wherein all the possible links between the nodes C and R of the wireless communication network are shown.

FIG. 4 illustrates an example in which all the possible links between the nodes C and R of the wireless communication network are depicted.

At the step E308, the concentrator determines a score S(C) for each possible path between the node selected and the root node in accordance with the following formula:

$$S(C) = \alpha * \sum_{links\,l} \text{Cost\_rate}(l) + \beta * \sum_{links\,l} \text{Cost\_latency}(l)$$

where $\alpha$ and $\beta$ take the values corresponding to the service class of the node selected, l is the index associated with each link on the path.

At the step E309, the concentrator determines the best path among all the possible paths from the scores calculated at the step E308. The best path is the path having the minimum score. Thus, by using the coefficients $\alpha$ and $\beta$ that are dependent on the service class of the node selected, the topology determined is optimum and is adapted to the equipment connected to the node.

For example, the best path is the path CAR.

At the step E310, the concentrator associates the fixed variable with each link on the best path determined.

For example, the fixed variable is associated with the links between the nodes C and A and between the nodes A and R.

At the step E311, the concentrator associates the variable resolved with the nodes through which the path passes, for example with the nodes C, A and R.

At the step E312, the concentrator checks whether there exists a node the associated variable of which is not resolved.

If so, the concentrator passes to the step E314. If not, the concentrator passes to the step E315. At the step E314, the concentrator selects the following node the associated variable of which is not resolved in the order determined at the step E301 and returns to the step E307.

For example, the node selected is the node B.

The concentrator performs the steps E307 to E312 for the selected node B in order to determine the optimum path connecting the node B to the node R.

All the paths containing the links CR are excluded since they create a loop with the links CA and AR.

For example, the best path is the path BR.

The fixed variable is associated with the link between the nodes B and R.

The concentrator associates the resolved variable with the node B.

At the step E314, the concentrator selects the following node the associated variable of which is not resolved in the order determined at the step E301 and returns to the step E307.

For example, the node selected is the node D.

The concentrator performs the steps E307 to E312 for the selected node D in order to determine the optimum path connecting the node D to the node R and next selects the node E for execution of the steps E307 to E312 in order to determine the optimum path connecting the node E to the node R.

At the step E315, the concentrator transfers each determined path to the other nodes for application of the determined topology.

Figure 5:
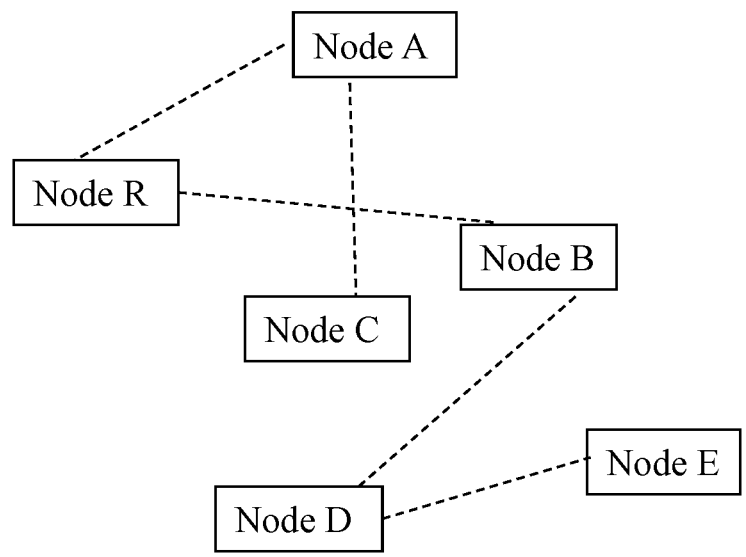
FIG. 5 illustrates an example of the topology of the paths in the wireless communication network determined by the present invention.

FIG. 5 illustrates an example of the topology of the paths in the wireless communication network determined by the present invention.

The invention claimed is:

1. A method for determining a topology of a wireless communication network composed of a plurality of nodes connected or not respectively to at least one equipment, one of the nodes, referred to as the root node, being connected to an external network, wherein said method causing the device to perform:

determining a service class for each node, the service class being determined according to the equipment connected to the node, if a node is connected to a telephone, the service class associated with the node is the voice over IP class VOIP, if the node is connected to an audiovisual set-top box the service class associated with the node is the television over IP TV ultra high definition class IPTV UHD, if the node is connected to a television set the service class associated with the node is IP TV high definition IPTV HD, for the other nodes, the associated service class is data, or the class of service is determined by the user of the communication network or the operator of the communication network, obtaining, from each node, information representing the quality of the link between the node and other nodes, calculating, for each link, parameters representing the quality of the link, classifying the nodes according to the service class thereof and, for the nodes having the same service class, according to the number of links making up the path that separates them from the root node, determining, for each node and according to the classification, possible paths connecting the node to the root node, calculating, for each path determined, a score from parameters representing the quality of the link and from values of coefficients dependent on the service class of the node, selecting the path for the node having a minimum score.

2. The method according to claim 1, wherein when a path is selected for a node said method causing the device to perform:

associating, with each link in the selected path, a so-called fixed variable, associating, with each node of the path through which the path passes, a resolved variable, and in that the determination, for each following node, of possible paths connecting the following node to the root node, is furthermore performed without using the links forming a loop with other links with which the fixed variable is associated.

3. The method according to claim 2, wherein the determination of possible paths connecting the following node to the root node is performed if the following node is not associated with the resolved variable.

4. The method according to claim 1, wherein the information representing the quality of the link between the node and other nodes is the physical bit rate of the link and the latency.

5. The method according to claim 1, wherein the communication network is a domestic network.

6. A device for determining a topology of a wireless communication network composed of a plurality of nodes connected or not respectively to at least one equipment, one of the nodes, referred to as the root node, being connected to an external network, the device comprising circuitry causing the device to implement:

determining a service class for each node, the service class being determined according to the equipment connected to the node, if a node is connected to a telephone, the service class associated with the node is the voice over IP class VOIP, if the node is connected to an audiovisual set-top box the service class associated with the node is the television over IP TV ultra high definition class IPTV UHD, if the node is connected to a television set the service class associated with the node is IP TV high definition IPTV HD, for the other nodes, the associated service class is data, or the class of service is determined by the user of the communication network or the operator of the communication network, obtaining, from each node, information representing the quality of the link between the node and other nodes, calculating, for each link, parameters representing the quality of the link, classifying the nodes according to the service class thereof and, for the nodes having the same service class, according to the number of links making up the path that separates them from the root node, determining, for each node and according to the classification, possible paths connecting the node to the root node, calculating, for each path determined, a score from parameters representing the quality of the link and from values of coefficients dependent on the service class of the node, selecting the path for the node having a minimum score.

7. A node that comprises the device according to claim 6.

8. A non-transitory recording medium whereon there is stored a computer program comprising instructions for implementing, by a device, the method according to claim 1, when said program is executed by the device.

* * * * *